United States Patent
Inoue et al.

(10) Patent No.: US 11,713,034 B2
(45) Date of Patent: Aug. 1, 2023

(54) CONTROL APPARATUS FOR VEHICLE

(71) Applicant: SUBARU CORPORATION, Tokyo (JP)

(72) Inventors: Wataru Inoue, Tokyo (JP); Tetsu Matsuzaki, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 0 days.

(21) Appl. No.: 17/567,596

(22) Filed: Jan. 3, 2022

(65) Prior Publication Data

US 2022/0242396 A1 Aug. 4, 2022

(30) Foreign Application Priority Data

Jan. 29, 2021 (JP) ................................ 2021-012868

(51) Int. Cl.
| | |
|---|---|
| *B60W 10/08* | (2006.01) |
| *B60W 20/10* | (2016.01) |
| *B60W 10/06* | (2006.01) |
| *B60W 10/107* | (2012.01) |

(52) U.S. Cl.
CPC ............ *B60W 20/10* (2013.01); *B60W 10/06* (2013.01); *B60W 10/08* (2013.01); *B60W 10/107* (2013.01); *B60W 2710/0666* (2013.01); *B60W 2710/083* (2013.01); *B60W 2710/1005* (2013.01)

(58) Field of Classification Search
CPC .... B60W 10/06; B60W 10/08; B60W 10/107; B60W 10/11; B60W 2710/0666; B60W 2710/083; B60W 2710/1005; B60W 20/10; B60W 30/19

USPC .............................................................. 477/3
See application file for complete search history.

(56) References Cited

U.S. PATENT DOCUMENTS

| | | | |
|---|---|---|---|
| 11,485,347 B2* | 11/2022 | Sasaki .................. | B60W 20/10 |
| 2015/0031502 A1* | 1/2015 | Kaltenbach ........... | B60W 10/08 |
| | | | 180/65.265 |
| 2019/0359216 A1* | 11/2019 | Yamada ................ | B60K 6/387 |

FOREIGN PATENT DOCUMENTS

| | | | |
|---|---|---|---|
| JP | 2000-166023 A | | 6/2000 |
| JP | 2010188794 A | * | 9/2010 |
| JP | 2011218945 A | * | 11/2011 |
| JP | 2012-91573 A | | 5/2012 |

\* cited by examiner

*Primary Examiner* — Roger L Pang
(74) *Attorney, Agent, or Firm* — McDermott Will & Emery LLP

(57) ABSTRACT

A control apparatus for a vehicle is configured to be applied to a hybrid vehicle that includes an electric motor and an engine that are coupled to a drive wheel. The control apparatus includes a transmission mechanism and a torque processor. The transmission mechanism is to be provided between the engine and the drive wheel, and configured to switch between a plurality of fixed gear ratios to perform a shift. The torque processor is configured to temporarily decrease a torque of the electric motor and a torque of the engine upon execution of an upshift of the transmission mechanism, and configured to decrease, before the execution of the upshift of the transmission mechanism, a proportion of the torque of the electric motor to a drive wheel torque of the drive wheel as compared with a recent proportion of the torque of the electric motor to the drive wheel torque.

10 Claims, 7 Drawing Sheets

CONTROL APPARATUS FOR VEHICLE

CROSS-REFERENCE TO RELATED APPLICATIONS

The present application claims priority from Japanese Patent Application No. 2021-012868 filed on Jan. 29, 2021, the entire contents of which are hereby incorporated by reference.

BACKGROUND

The technology relates to a control apparatus for a vehicle which is to be applied to a hybrid vehicle.

A hybrid vehicle is provided with a power train that includes an engine and an electric motor. The power train includes a transmission mechanism such as an automatic transmission. For example, reference is made to Japanese Unexamined Patent Application Publication Nos. 2000-166023 and 2012-91573.

SUMMARY

An aspect of the technology provides a control apparatus for a vehicle. The control apparatus is configured to be applied to a hybrid vehicle that includes an electric motor, an engine, and a drive wheel. The electric motor and the engine are coupled to the drive wheel. The control apparatus includes a transmission mechanism and a torque processor. The transmission mechanism is to be provided between the engine and the drive wheel, and configured to switch between a plurality of fixed gear ratios to perform a shift. The torque processor is configured to temporarily decrease a torque of the electric motor and a torque of the engine upon execution of an upshift of the transmission mechanism, and configured to decrease, before the execution of the upshift of the transmission mechanism, a proportion of the torque of the electric motor to a drive wheel torque of the drive wheel to be transmitted from the transmission mechanism to the drive wheel as compared with a recent proportion of the torque of the electric motor to the drive wheel torque.

An aspect of the technology provides a control apparatus for a vehicle. The control apparatus is configured to be applied to a hybrid vehicle that includes an electric motor and an engine, and a drive wheel. The electric motor and the engine are coupled to the drive wheel. The control apparatus includes a transmission mechanism and circuitry. The transmission mechanism is to be provided between the engine and the drive wheel, and configured to switch between a plurality of fixed gear ratios to perform a shift. The circuitry is configured to decrease, before execution of an upshift of the transmission mechanism, a proportion of a torque of the electric motor to a drive wheel torque of the drive wheel to be transmitted from the transmission mechanism to the drive wheel as compared with a recent proportion of the torque of the electric motor to the drive wheel torque.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the technology.

DETAILED DESCRIPTION

Figure 1:
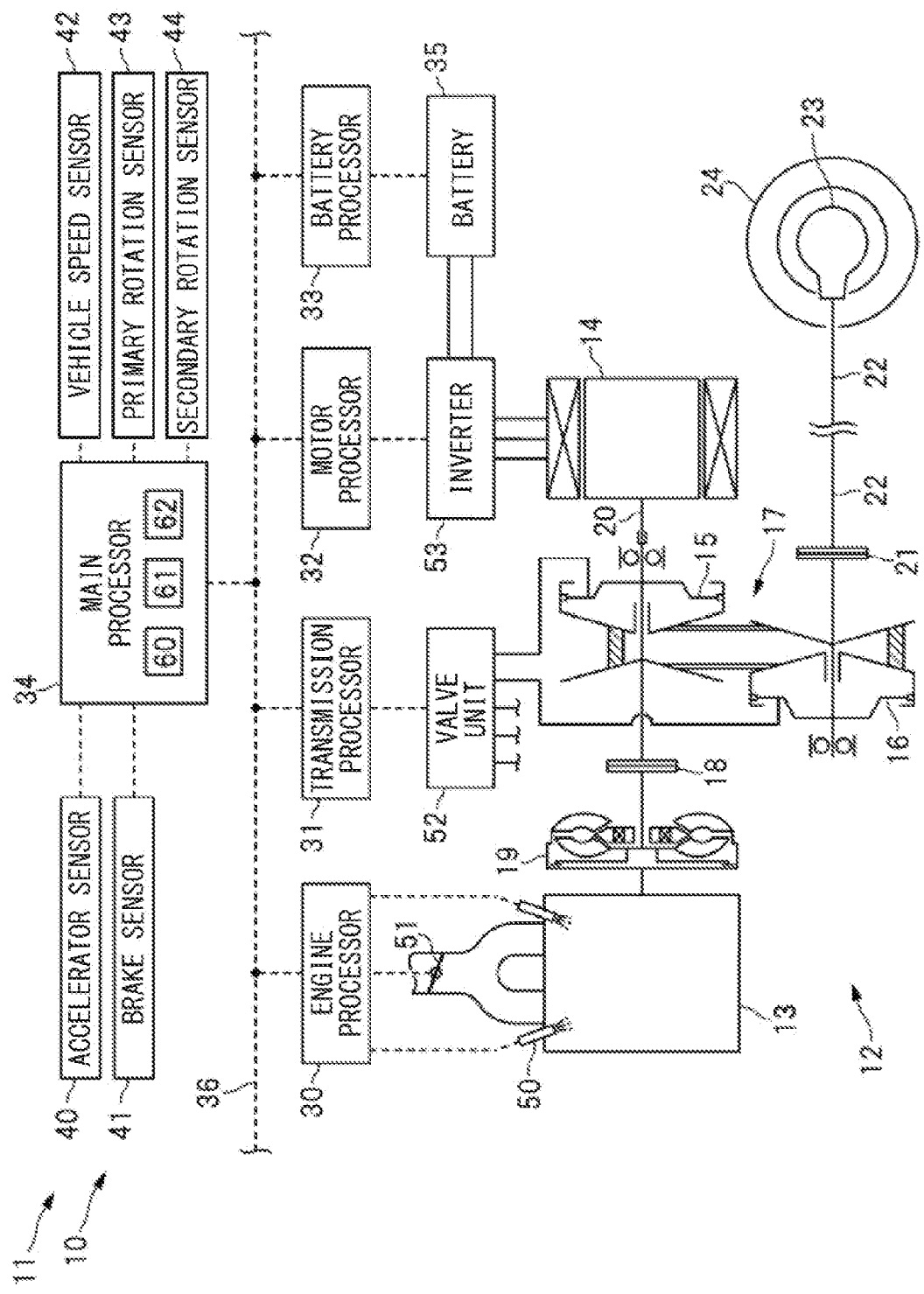
FIG. 1 is a diagram illustrating an example of a configuration of a hybrid vehicle to which a control apparatus for a vehicle according to one example embodiment of the technology is applied.

An engine torque and a motor torque are often decreased temporarily to reduce a shift shock caused by inertia, upon upshifting a transmission mechanism. However, it is difficult to control both the engine torque and the motor torque appropriately due to a mutual difference in responsiveness between an engine and an electric motor. For example, a variation occurs between a timing at which the engine torque decreases and a timing at which the motor torque decreases, constituting a factor of giving a sense of discomfort to an occupant.

It is desirable to provide a control apparatus for a vehicle which makes it possible to execute an upshift of a transmission mechanism while reducing a sense of discomfort to be given to an occupant.

In the following, some example embodiments of the technology are described in detail with reference to the accompanying drawings. Note that the following description is directed to illustrative examples of the disclosure and not to be construed as limiting to the technology. Factors including, without limitation, numerical values, shapes, materials, components, positions of the components, and how the components are coupled to each other are illustrative only and not to be construed as limiting to the technology. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same reference numerals to avoid any redundant description. In addition, elements that are not directly related to any embodiment of the technology are unillustrated in the drawings.

[Configuration of Vehicle]

FIG. 1 is a diagram illustrating an example of a configuration of a hybrid vehicle 11 to which a control apparatus for a vehicle (hereinafter simply referred to as a "control apparatus") 10 according to an example embodiment of the technology is applied. Referring to FIG. 1, the hybrid vehicle 11 may have a powertrain 12 that includes an engine 13 and a motor generator 14 each serving as a drive source. In one embodiment, the motor generator 14 may serve as an "electric motor". The powertrain 12 may also have a continuously variable transmission 17 that includes a primary pulley 15 and a secondary pulley 16. In one embodiment, the continuously variable transmission 17 may serve as a "transmission mechanism".

The primary pulley 15 may have one side coupled to the engine 13 via an input clutch 18 and a torque converter 20. The primary pulley 15 may have the other side coupled to the motor generator 14 via a rotor shaft 20. The secondary pulley 16 may be coupled to a drive wheel output shaft 22 via an output clutch 21. The drive wheel output shaft 22 may be coupled to a drive wheel 24 via a differential mechanism 23. Accordingly, the engine 13 and the motor generator 14 may be coupled to the drive wheel 24. The continuously variable transmission 17 may be provided between the drive wheel 24 and the engine 13.

[Control System]

As illustrated in FIG. 1, the control apparatus 10 may include a plurality of processors that controls an operation state of the powertrain 12. The plurality of processors each may be or include a microcomputer. Non-limiting examples of the processors may include: an engine processor 30 that controls the engine 13; a transmission processor 31 that controls devices including, for example, the continuously variable transmission 17; a motor processor 32 that controls the motor generator 14; a battery processor 33 that controls a battery 35 coupled to the motor generator 14; and a main processor 34 that controls the engine processor 30, the transmission processor 31, the motor processor 32, and the battery processor 33 in an overall fashion. The engine processor 30, the transmission processor 31, the motor processor 32, the battery processor 33, and the main processor 34 may be so coupled to each other via an in-vehicle network 36 as to allow for a communication freely therebetween. The in-vehicle network 36 may be, for example, a controller area network (CAN).

The main processor 34 may output a control signal to each of the engine processor 30, the transmission processor 31, the motor processor 32, and the battery processor 33 to control the devices including, for example, the engine 13, the motor generator 14 and the continuously variable transmission 17 such that they operate collaboratively with respect to each other. The main processor 34 may be coupled to various sensors. Non-limiting examples of the sensors may include: an accelerator sensor 40 that detects an amount of operation performed on an accelerator pedal (hereinafter referred to as an "accelerator position"); and a brake sensor 41 that detects an amount of operation performed on a brake pedal. Non-limiting examples of the sensors may further include: a vehicle speed sensor 42 that detects a vehicle speed as a traveling speed of the hybrid vehicle 11; a primary rotation sensor 43 that detects a primary rotation speed as a rotation speed of the primary pulley 15; and a secondary rotation sensor 44 that detects a secondary rotation speed as a rotation speed of the secondary pulley 16.

The main processor 34 may set control targets of devices including, for example, the engine 13 and the motor generator 14 on the basis of pieces of input data obtained from the various sensors including the accelerator sensor 40, the brake sensor 41, the vehicle speed sensor 42, the primary rotation sensor 43, and the secondary rotation sensor 44 and the processors including the engine processor 30, the transmission processor 31, the motor processor 32, and the battery processor 33. The main processor 34 may output the control signals based on the control targets to the respective engine processor 30, transmission processor 31, motor processor 32, and battery processor 33. The engine processor 30, the transmission processor 31, the motor processor 32, and the battery processor 33 each may control corresponding one or more of devices including, for example, the engine 13, the motor generator 14, and the continuously variable transmission 17 on the basis of the control signal supplied from the main processor 34.

The engine processor 30 may output a control signal to devices including, for example, an injector 50 and a throttle valve 51 to control a torque of the engine 13 (hereinafter referred to as an "engine torque"). The transmission processor 31 may output a control signal to a valve unit 52 that adjusts a pressure of a hydraulic oil to control an operation state of each of devices including, for example, the continuously variable transmission 17, the input clutch 18, the output clutch 21, and the torque converter 19. The motor processor 32 may output a control signal to an inverter 53 that couples the motor generator 14 and the battery 35 together to control a torque of the motor generator 14 (hereinafter referred to as a "motor torque").

The battery processor 33 may monitor charging and discharging of the battery 35, and may control, for example, an unillustrated relay of the battery 35 on an as-necessary basis. The battery processor 33 may detect, for example, a state of charge (SOC) of the battery 35, on the basis of factors including, for example, a charge/discharge current and a terminal voltage. The SOC, i.e., a state of charge of the battery 35 refers to a ratio that indicates a remaining amount of electric power stored in the battery 35, and is defined as a ratio of an amount of electric power stored in the battery 35 to a full charge capacity of the battery 35. A regenerative operation of the motor generator 14 may be limited in a case where the SOC of the battery 35 exceeds a predetermined upper limit, and a powering operation of the motor generator 14 may be limited in a case where the SOC of the battery 35 falls below a predetermined lower limit.

[Target Drive Force]

Figure 2:
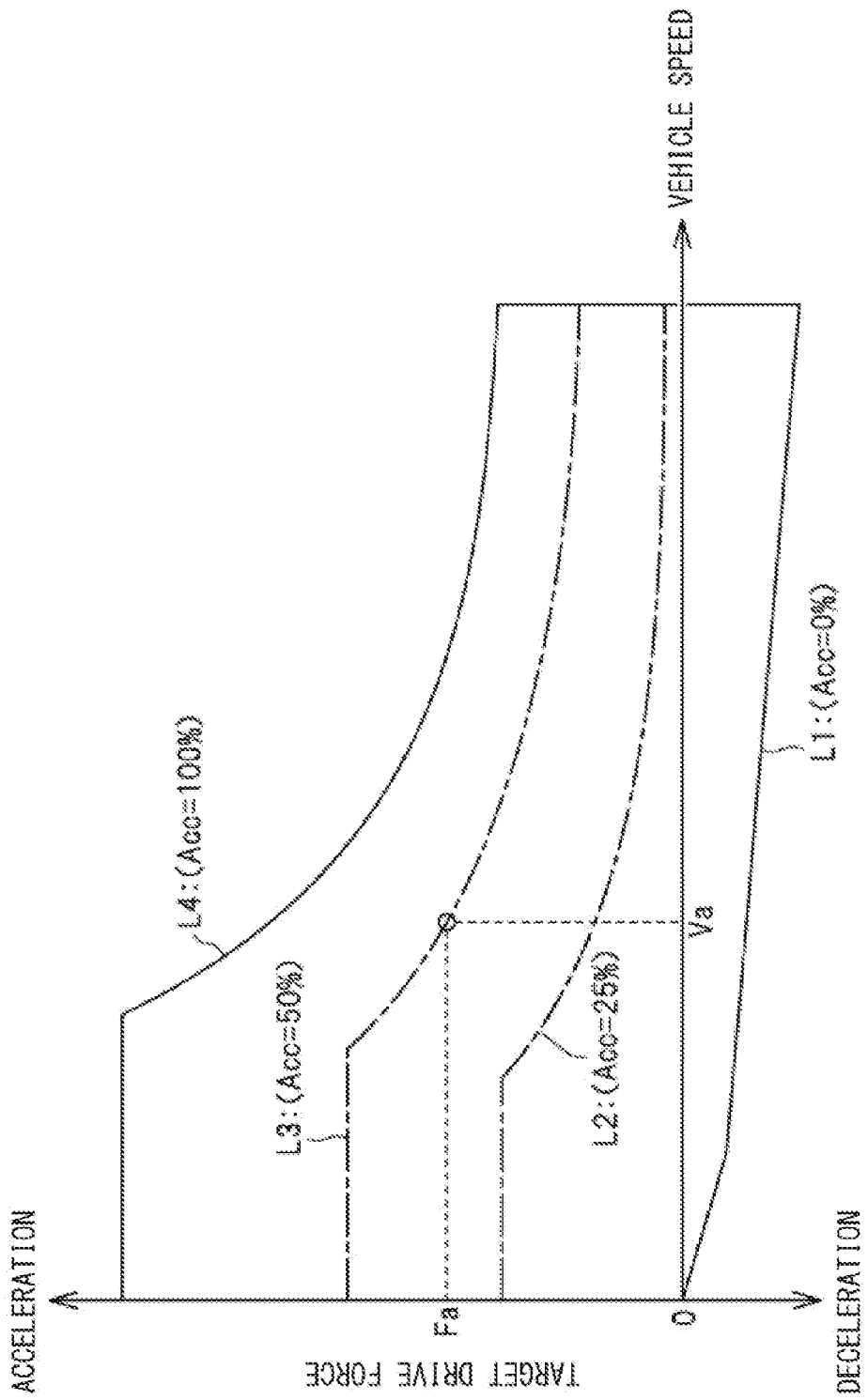
FIG. 2 is a diagram illustrating a drive force map used upon setting a target drive force.

The main processor 34 includes a torque setting unit 61 that sets a target torque of the engine 13 and a target torque of the motor generator 14. The main processor may include a drive force setting unit 60 that sets a target drive force of the hybrid vehicle 11. The drive force setting unit 60 of the main processor 60 may set the target drive force, on the basis of the vehicle speed and the accelerator position. FIG. 2 is a diagram illustrating a drive force map used upon setting the target drive force. Referring to FIG. 2, characteristic lines L1 to L4 each indicating the target drive force for the corresponding accelerator position Acc may be set for the drive force map. For example, the target drive force may be set along the characteristic line L1 in a case where the accelerator position Acc is 0%, and the target drive force may be set along the characteristic line L2 in a case where the accelerator position Acc is 25%. Similarly, the target drive force may be set along the characteristic line L3 in a case where the accelerator position Acc is 50%, and the target drive force may be set along the characteristic line L4 in a case where the accelerator position Acc is 100%.

In an example case where the accelerator position Acc is "50%" and the vehicle speed is "Va", "Fa" may be set as the target drive force. The torque setting unit 61 of the main processor 34 may set the target torque of the engine 13 and the target torque of the motor generator 14 on the basis of the target drive force Fa, in order to obtain the target drive force Fa by controlling the engine 13 and the motor generator 14. In a case where the target torques are thus set, the main processor 34 may output the control signal to the engine processor 30, and the engine processor 30 may so execute a torque control of the engine 13 as to cause the engine torque to be or become closer to the target torque. Similarly, the main processor 34 may output the control signal to the motor processor 32, and the motor processor 32 may so execute a torque control of the motor generator 14 as to cause the motor torque to be or becomes closer to the target torque. In one embodiment, the torque setting unit 61 of the main processor 34, the engine processor 30, and the motor processor 32 may serve as a "torque processor". The torque processor controls the engine torque and the motor torque. It should be noted that four characteristic lines L1 to L4 are set for the drive force map illustrated in an example of FIG. 2 for easier description, although the number of characteristic lines is not limited thereto. In some embodiments, five or more characteristic lines may be set for the drive force map.

[Multi-Stage Shift Mode]

Figure 3A:
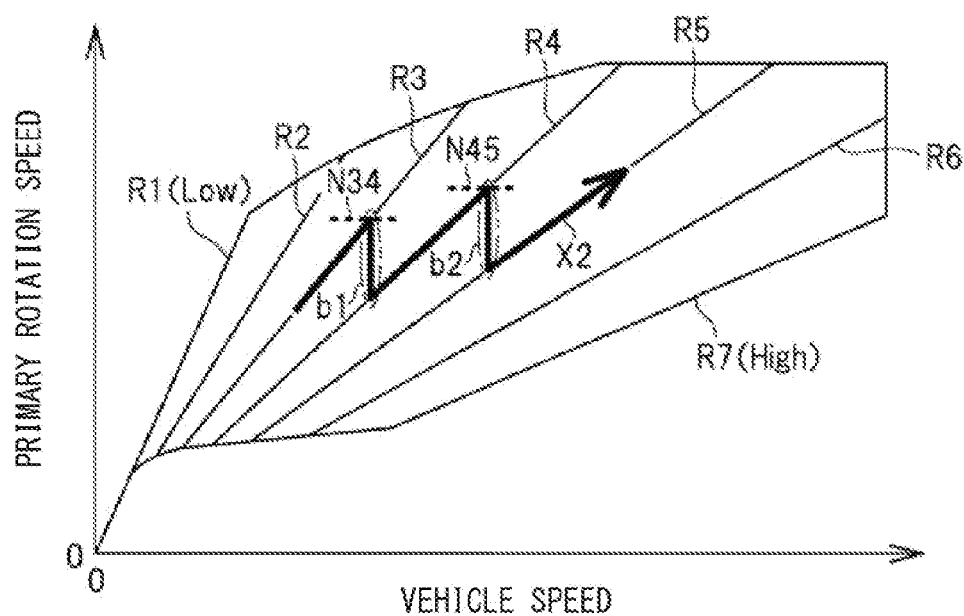
FIG. 3A is a diagram illustrating an example of fixed gear ratios used in a multi-stage shift mode.
Figure 3B:
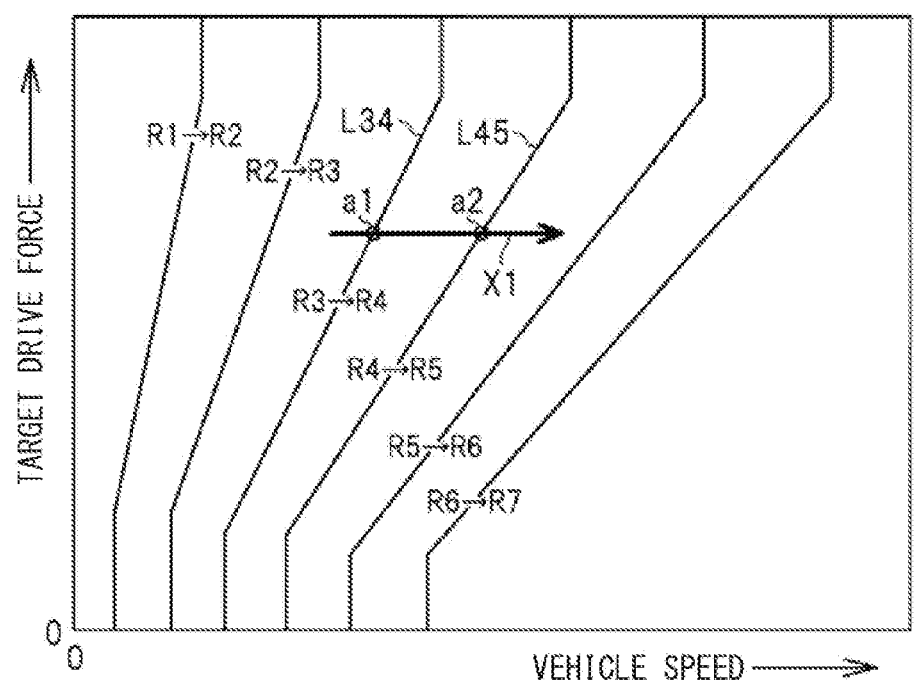
FIG. 3B is a diagram illustrating an example of shift patterns used for an upshift in the multi-stage shift mode.

The main processor 34 may include a shift processor 62 that sets a shift mode and a target gear ratio of the continuously variable transmission 17. The hybrid vehicle 11 according to an illustrated example embodiment may have, as the shift modes of the continuously variable transmission 17, a continuously variable shift mode that changes a gear ratio continuously and a multi-stage shift mode that changes the gear ratio stepwise. The multi-stage shift mode may be executed on the basis of, for example, an operation of a select lever performed by a driver. FIG. 3A is a diagram illustrating an example of fixed gear ratios used in the multi-stage shift mode. FIG. 3B is a diagram illustrating an example of shift patterns used for an upshift in the multi-stage shift mode.

Referring to FIG. 3A, fixed gear ratios R1 to R7 used for the multi-stage shift mode may be set in a shift range defined between a maximum gear ratio Low and a minimum gear ratio High. Upon executing the multi-stage shift mode, the main processor 34 may refer to a shift pattern illustrated in FIG. 3B on the basis of the vehicle speed and the target drive force, and select, on the basis of the shift pattern, relevant one of the fixed gear ratios R1 to R7 to be used for a shift control. For example, in a case where the vehicle speed and the target drive force so change as to exceed beyond an upshift line denoted by a solid line illustrated in FIG. 3B, the upshift may be executed that uses the plurality of fixed gear ratios R1 to R7. In an example case where the vehicle speed and the target drive force make a transition as denoted by an arrow X1 of FIG. 3B, the upshift may be executed in which the fixed gear ratio is switched from the fixed gear ratio R3 to the fixed gear ratio R4, and the upshift may be executed in which the fixed gear ratio is switched from the fixed gear ratio R4 to the fixed gear ratio R5, as denoted by an arrow X2 of FIG. 3A.

The upshift from the fixed gear ratio R3 to the fixed gear ratio R4 may be executed as denoted by a reference sign b1 of FIG. 3A, in a case where the vehicle speed and the target drive force so change as to exceed beyond an upshift line L34 as denoted by a reference sign a1 of FIG. 3B. In a case where the vehicle speed and the target drive force so change as to exceed beyond an upshift line L45 as denoted by a reference sign a2 of FIG. 3B, the upshift from the fixed gear ratio R4 to the fixed gear ratio R5 may be executed as denoted by a reference sign b2 of FIG. 3A. In other words, the upshift from the fixed gear ratio R3 to the fixed gear ratio R4 may be executed, in a case where the primary rotation speed, i.e., an input rotation speed of the continuously variable transmission 17 reaches a predetermined upshift rotation speed N34 as illustrated in FIG. 3A. In a case where the primary rotation speed reaches a predetermined upshift rotation speed N45, the upshift from the fixed gear ratio R4 to the fixed gear ratio R5 may be executed. It should be noted that the upshift rotation speeds N34 and N45 illustrated in FIG. 3A may be calculated on the basis of the shift patterns illustrated in FIG. 3B. In other words, the upshift rotation speed for a determination of the start of the upshift may be calculated on the basis of pieces of traveling data including, for example, the target drive force, the vehicle speed, and the gear ratio.

[Torque-Down Control]

The fixed gear ratio may be switched between the fixed gear ratios R1 to R7 upon the upshift in the multi-stage shift mode as described above to quickly change the gear ratio, thereby significantly increasing a shift speed as compared with that in the continuously variable shift mode. However, increasing the shift speed of the continuously variable transmission 17 can lead to an excessive decrease in a speed of a device such as the primary pulley 15. In this case, an inertia torque that acts on an input side of the continuously variable transmission 17 can increase, constituting a factor of bringing about a shift shock. To address this, according to an example embodiment, the torque setting unit 61 of the main processor 34 so decreases the engine torque and the motor torque temporarily as to cancel out the inertia torque, upon executing the upshift of the continuously variable transmission 17. For example, as the torque-down control, the main processor 34 may decrease a transmission input torque T1 temporarily in accordance with a timing of execution of the upshift. It should be noted that the transmission input torque T1 may be a torque to be inputted to the continuously variable transmission 17 from the engine 13 and the motor generator 14.

Figure 4:
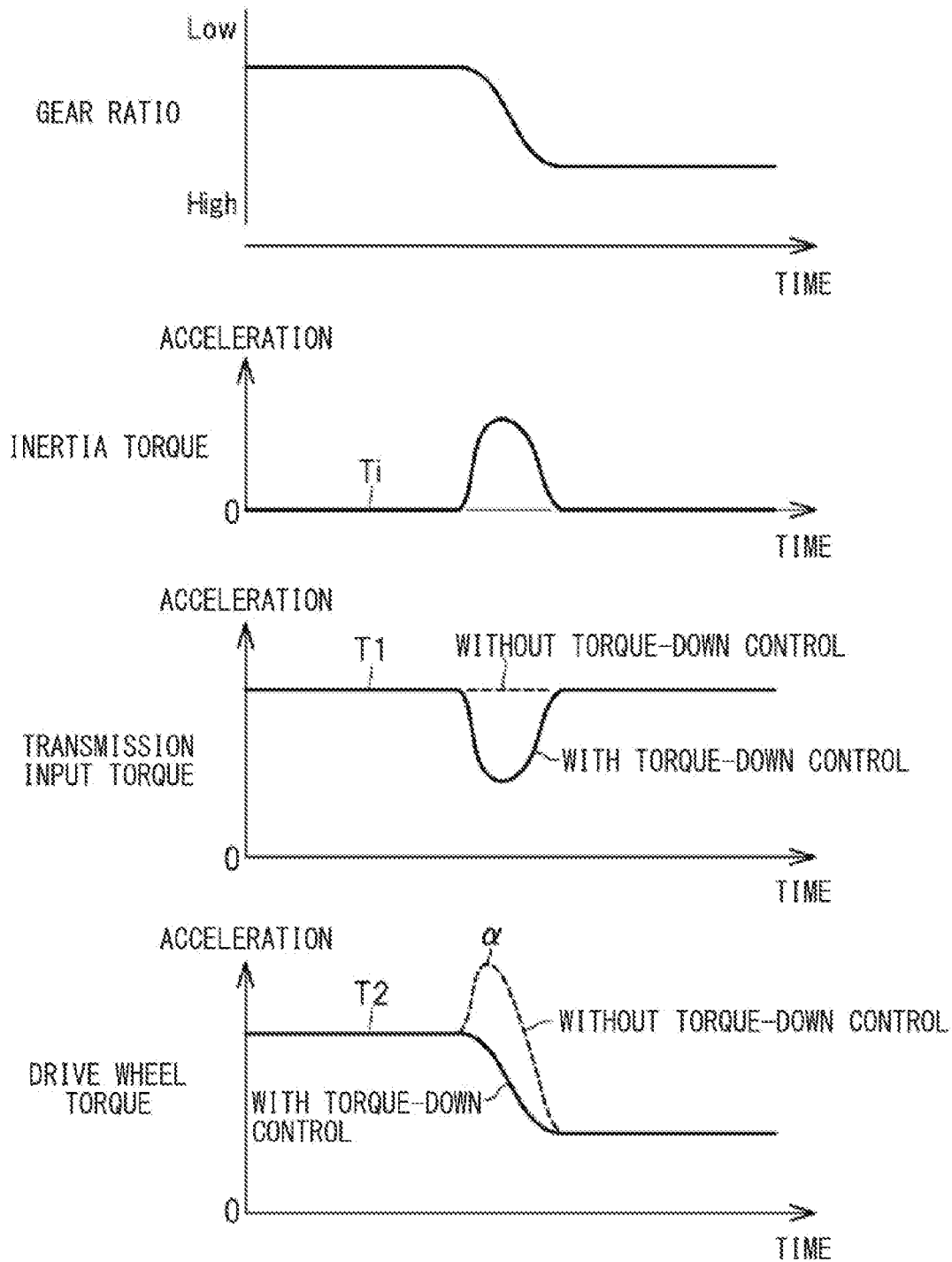
FIG. 4 is a diagram illustrating an example of a situation in which a torque-down control is executed.

FIG. 4 is a diagram illustrating an example of a situation in which the torque-down control is executed. Referring to FIG. 4, an inertia torque T1 can be generated on the input side of the continuously variable transmission 17 when the continuously variable transmission 17 is upshifted in the multi-stage shift mode. The inertia torque T1 can act in a direction of increasing the speed of the primary pulley 15 and thus can constitute a factor of temporarily increasing a drive wheel torque T2 to be transmitted from the continuously variable transmission 17 to the drive wheel 24 as denoted by a broken line a of FIG. 4. Such a temporary increase in the drive wheel torque T2 can give a feeling of discomfort to the driver as the shift shock. Accordingly, as the torque-down control, the main processor 34 may so decrease the transmission input torque T1 as to absorb the inertial torque T1. Decreasing the transmission input torque T1 in accordance with the upshift as described above helps to reduce the excessive increase in the drive wheel torque T2 and to reduce the shift shock.

[Torque Proportion Adjustment Control Associated with Upshift (Timing Chart)]

The transmission input torque T1 may be decreased in accordance with the execution of the upshift in the torque control as described above. It should be noted that the transmission input torque T1 is constituted by the engine torque and the motor torque. It should be also noted that it is difficult to control both the engine torque and the motor torque appropriately due to a mutual difference in responsiveness between the engine 13 and the motor generator 14. For example, a variation occurs between a timing at which the engine torque decreases and a timing at which the motor torque decreases, constituting a factor of giving a sense of discomfort to the driver. To address this, the control apparatus 10 according to an example embodiment performs a torque proportion adjustment control before the execution of the upshift to decrease a proportion of the torque of the motor generator 14 to the drive wheel torque T2 (hereinafter referred to as a "motor torque proportion Ptm").

Figure 5:
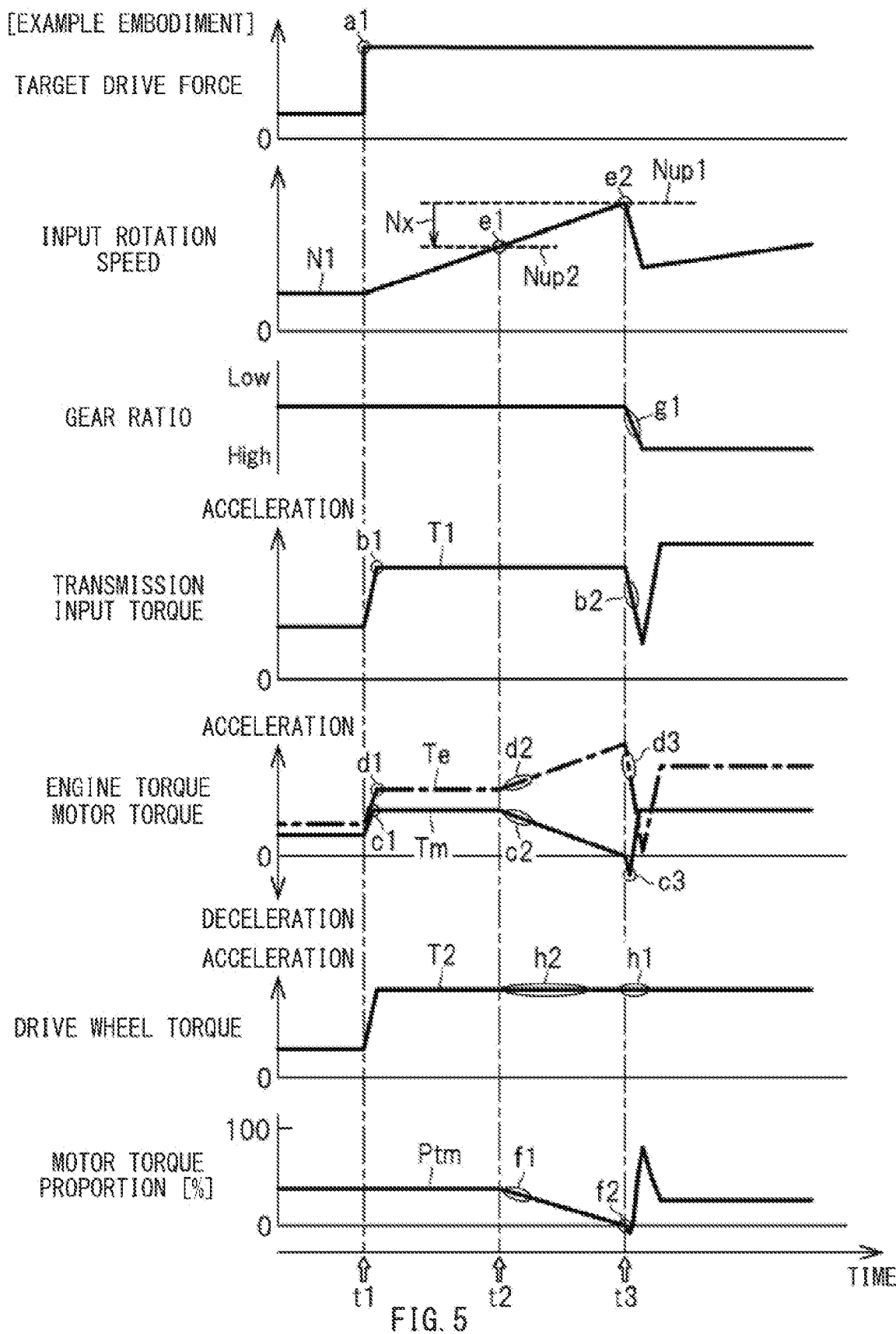
FIG. 5 is a timing chart illustrating an example of a situation in which a torque proportion adjustment control is executed.

In the following, a description is given of the torque proportion adjustment control to be performed by the control apparatus 10. FIG. 5 is a timing chart illustrating an example of a situation in which the torque proportion adjustment control is executed. The timing chart of FIG. 5 illustrates a situation upon the execution of the upshift based on the multi-stage shift mode, as denoted by the arrows X1 and X2 of FIGS. 3A and 3B. It should be noted that an input rotation speed N1 illustrated in FIG. 5 refers to the primary rotation speed, i.e., the input rotation speed of the continuously variable transmission 17.

At a timing t1 of FIG. 5, when the target drive force is increased by the pressing of the accelerator pedal (denoted by a reference sign a1), the transmission input torque T1 to be inputted to the continuously variable transmission 17 may be increased (denoted by a reference sign b1). In other words, the increase in the target drive force by the pressing of the accelerator pedal (denoted by the reference sign a1) may so increase the motor torque Tm and the engine torque Te (denoted by reference signs c1 and d1) as to increase the transmission input torque T1. In addition, the upshift rotation speed Nup1 for the determination of the start of the execution of the upshift may be calculated on the basis of pieces of traveling data including, for example, the target drive force, the vehicle speed, and the gear ratio. Further, a proportion adjustment rotation speed Nup2 for a determination of the start of the adjustment of the motor torque proportion Ptm may be calculated by subtracting a predetermined rotation speed Nx from the upshift rotation speed Nup1.

At a timing t2, when the input rotation speed N1 reaches the proportion adjustment rotation speed Nup2 (denoted by a reference sign e1), the motor torque Tm may be decreased and the engine torque Te may be increased (denoted by reference signs c2 and d2), in order to decrease the motor torque proportion Ptm that is after the timing t2 as compared with the most-recent motor torque proportion, e.g., the motor torque proportion Ptm that is at the timing t2 (denoted by a reference sign f1). Thereafter, at a timing t3, when the input rotation speed N1 reaches the upshift rotation speed Nup1 (denoted by a reference sign e2), the upshift of the continuously variable transmission 17 may be executed (denoted by a reference sign g1), and the torque-down control that reduces the shift shock may be executed as well (denoted by a reference sign b2). In other words, in order to reduce the shift shock upon the upshift, the motor torque Tm and the engine torque Te may be so decreased temporarily (denoted by reference signs c3 and d3) as to decrease the transmission input torque T1 temporarily (denoted by the reference sign b2).

Thus, executing the torque-down control in accordance with the execution of the upshift (denoted by the reference sign b2) helps to reduce the excessive increase in the drive wheel torque T2 (denoted by a reference sign h1) and to reduce the shift shock associated with the upshift. Further, before the execution of the upshift, the motor torque proportion Ptm as the proportion of the torque of the motor generator 14 to the drive wheel torque T2 is decreased (denoted by the reference sign f1) by decreasing the motor torque Tm and increasing the engine torque Te (denoted by the reference signs c2 and d2). This makes it possible to decrease the motor torque proportion Ptm to around zero (denoted by a reference sign f2) at a timing at which the upshift is started, as denoted by the timing t3. Decreasing the motor torque proportion Ptm in advance before the execution of the upshift as described above helps to reduce the shock resulting from the difference in responsiveness between the motor generator 14 and the engine 13.

Specifically, upon decreasing the motor torque Tm and the engine torque Te by the torque-down control, the variation occurs between the timing at which the engine torque Te decreases and the timing at which the motor torque Tm decreases due to the difference in responsiveness between the motor generator 14 and the engine 13, constituting a factor of giving a sense of discomfort to the driver. However, decreasing the motor torque proportion Ptm as compared with the most-recent motor torque proportion before the execution of the upshift helps to reduce the sense of discomfort caused by the variation between the timing at which the engine torque Te decreases and the timing at which the motor torque Tm decreases. In other words, it is possible to execute the torque-down control by the adjustment of the engine torque Te substantially, which helps to reduce the sense of discomfort caused by the variation between the timing at which the engine torque Te decreases and the timing at which the motor torque Tm decreases.

Further, as noted by the timing t2 and t3 of FIG. 5, the engine torque Te may be so increased as to compensate for the decrease in the motor torque Tm, upon decreasing the motor torque proportion Ptm in the torque proportion adjustment control. This helps to keep the drive wheel torque T2 substantially constant (denoted by a reference sign h2) even in a case where the motor torque proportion Ptm is to be decreased by the torque proportion adjustment control, and thereby to decrease the motor torque proportion Ptm without giving the driver the sense of discomfort.

Figure 6:
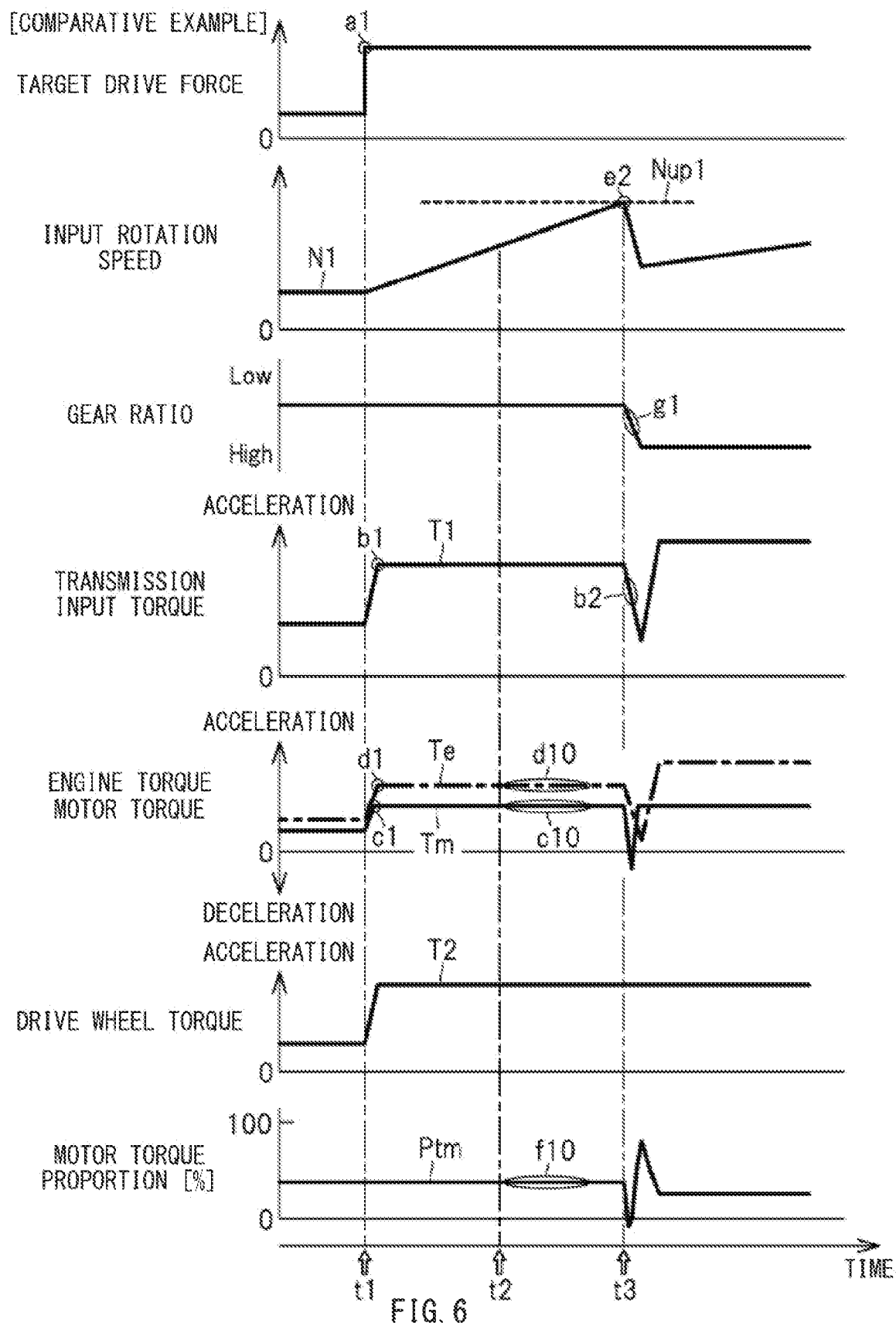
FIG. 6 is a timing chart illustrating an example of a situation according to a comparative example in which an upshift is executed.

FIG. 6 is a timing chart illustrating an example of a situation according to a comparative example in which an upshift is executed. The timing chart of FIG. 6 illustrates a traveling situation similar to that illustrated in FIG. 5. It should be noted that the similarities between FIG. 5 and FIG. 6 are denoted with the same reference numerals and will not be described in detail, except for the differences between FIG. 5 and FIG. 6 in respective transitions of the motor torque Tm, the engine torque Te, and the motor torque proportion Ptm.

Referring to an example illustrated in FIG. 6, the upshift based on the multi-stage shift mode is executed (denoted by the reference sign g1) at the timing t3 with the motor torque Tm, the engine torque Te, and the motor torque proportion Ptm being maintained (denoted by reference signs c10, d10, and f10). Maintaining the motor torque proportion Ptm as described above, i.e., maintaining a level of an influence of the motor torque Tm on the torque-down control, can give the driver the sense of discomfort caused by the variation between the timing at which the engine torque Te decreases and the timing at which the motor torque Tm decreases. In contrast, the control apparatus 10 according to an example embodiment decreases the motor torque proportion Ptm before the execution of the upshift to decrease the level of the influence of the motor torque Tm on the torque-down control, which helps to reduce the sense of discomfort caused by the variation between the timing at which the engine torque Te decreases and the timing at which the motor torque Tm decreases.

[Torque Proportion Adjustment Control Associated with Upshift (Flowchart)]

Figure 7:
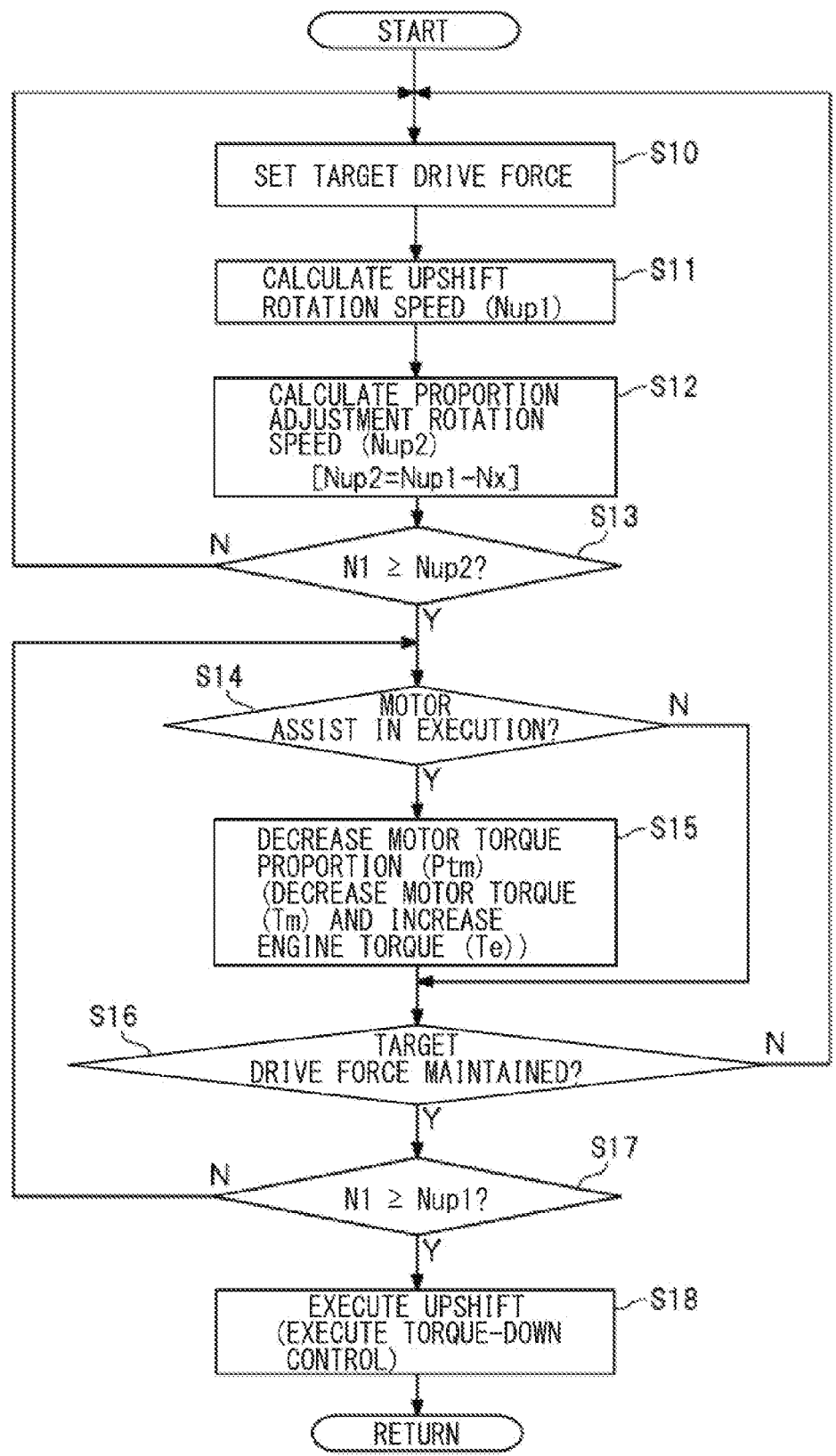
FIG. 7 is a flowchart illustrating an example of a procedure of execution of the torque proportion adjustment control.

A description is given next of the torque proportion adjustment control described above with reference to a flowchart. FIG. 7 is a flowchart illustrating an example of a procedure of execution of the torque proportion adjustment control. The flowchart of FIG. 7 illustrates a situation upon the execution of the upshift based on the multi-stage shift mode, as denoted by the arrows X1 and X2 of FIGS. 3A and 3B.

Referring to FIG. 7, in step S10, the target drive force of the hybrid vehicle 11 may be set on the basis of the vehicle speed and the accelerator position. In step S11, the upshift rotation speed Nup1 may be calculated on the basis of factors including, for example, the target drive force, the vehicle speed, and the gear ratio. In step S12, the proportion adjustment rotation speed Nup2 may be calculated by subtracting the predetermined rotation speed Nx from the upshift rotation speed Nup1. In step S13, whether the input rotation speed N1 is equal to or greater than the proportion adjustment rotation speed Nup2 may be determined. If the input rotation speed N1 is determined as being less than the proportion adjustment rotation speed Nup2 (step S13: N), the procedure may proceed to step S10 to update factors including, for example, the target drive force and the upshift rotation speed Nup1 on the basis of a current traveling state. If the input rotation speed N1 is determined as being equal to or greater than the proportion adjustment rotation speed Nup2 (step S13: Y), the procedure may proceed to step S14 to start the adjustment of the motor torque proportion Ptm.

First, in step S14, whether a motor assist is in execution may be determined. During the motor assist, the motor generator 14 may be so controlled as to be placed into a powering state. If the motor assist is determined as being in execution (step S14: Y), i.e., if the motor torque Tm is determined as being outputted, the procedure may proceed to step S15. In step S15, the motor torque proportion Ptm as the proportion of the torque of the motor generator 14 to the drive wheel torque T2 may be decreased by decreasing the motor torque Tm and increasing the engine torque Te. If the motor assist is determined as not being in execution (step S14: N), the procedure may proceed to step S16 without decreasing the motor torque proportion Ptm as the proportion of the torque of the motor generator 14 to the drive wheel torque T2, because the output of the motor torque Tm is absent.

In step S16, whether traveling of the hybrid vehicle 11 involves a state in which the target drive force is maintained may be determined. If the target drive force is determined as being changed (step S16: N) by, for example, further pressing of the accelerator pedal, the procedure may proceed to step S10 to update factors including, for example, the target drive force and the upshift rotation speed Nup1. If the target drive force is determined as being maintained (step S16: Y) on the premise that, for example, the further pressing of the accelerator pedal is absent, the procedure may proceed to step S17. In step S17, whether the input rotation speed N1 is equal to or greater than the upshift rotation speed Nup1 may be determined. If the input rotation speed N1 is determined as being equal to or greater than the upshift rotation speed Nup1 (step S17: Y), the procedure may proceed to step S18. In step S18, the upshift may be executed in addition to the torque-down control. If the input rotation speed N1 is determined as being less than the upshift rotation speed Nup1 (step S17: N), the procedure may proceed to steps S14 and S15 again to continue decreasing the motor torque proportion Ptm in a case where the motor assist is in execution.

CONCLUSION

The control apparatus 10 according to an example embodiment described above decreases, before the execution of the upshift of the continuously variable transmission 17, the motor torque proportion Ptm as the proportion of the torque of the motor generator 14 to the drive wheel torque T2 as compared with the most-recent motor torque proportion. This helps to decrease the level of the influence of the motor torque Tm on the torque-down control, which helps to reduce the sense of discomfort caused by the variation between the timing at which the engine torque Te decreases and the timing at which the motor torque Tm decreases. In some embodiments, as illustrated in FIG. 5, the motor torque Tm may be decreased as compared with the most-recent motor torque before the execution of the upshift of the continuously variable transmission 17. This helps to decrease the level of the influence of the motor torque Tm on the torque-down control, which helps to reduce the sense of discomfort caused by the variation between the timing at which the engine torque Te decreases and the timing at which the motor torque Tm decreases.

It should be noted that, according to an example embodiment, decreasing the motor torque proportion Ptm as compared with the most-recent motor torque proportion before the start of the upshift may mean that the motor torque proportion Ptm at the timing t3 is decreased as compared with the motor torque proportion (i.e., the most-recent motor torque proportion) Ptm at the timing t2 illustrated in FIG. 5. Further, in some embodiments, decreasing the motor torque Tm as compared with the most-recent motor torque before the start of the upshift may mean that the motor torque Tm at the timing t3 is decreased as compared with the motor torque (i.e., the most-recent motor torque) Tm at the timing t2 illustrated in FIG. 5.

It should also be noted that the drive wheel torque T2 is constituted by the motor torque Tm and the engine torque Te. Accordingly, decreasing the motor torque proportion Ptm as the proportion of the torque of the motor generator 14 to the drive wheel torque T2 may mean that a proportion of the torque of the engine 13 to the drive wheel torque T2 (hereinafter referred to as an "engine torque proportion") is increased. In other words, in some embodiments, the control apparatus 10 may increase, before the execution of the upshift of the continuously variable transmission 17, the engine torque proportion as the proportion of the torque of the engine 13 to the drive wheel torque T2 as compared with the most-recent engine torque proportion. This helps to decrease the level of the influence of the motor torque Tm on the torque-down control, which helps to reduce the sense of discomfort caused by the variation between the timing at which the engine torque Te decreases and the timing at which the motor torque Tm decreases. In some embodiments, as illustrated in FIG. 5, the engine torque Te may be decreased as compared with the most-recent engine torque before the execution of the upshift of the continuously variable transmission 17. This helps to decrease the level of the influence of the motor torque Tm on the torque-down control, which helps to reduce the sense of discomfort caused by the variation between the timing at which the engine torque Te decreases and the timing at which the motor torque Tm decreases.

It should be noted that, according to some embodiments, increasing the engine torque proportion as compared with the most-recent engine torque proportion before the start of the upshift may mean that the engine torque proportion at the timing t3 is increased as compared with the engine torque proportion (i.e., the most-recent engine torque proportion) at the timing t2 illustrated in FIG. 5. Further, in some embodiments, increasing the engine torque Te as compared with the most-recent engine torque before the start of the upshift may mean that the engine torque Te at the timing t3 is increased as compared with the engine torque (i.e., the most-recent engine torque) at the timing t2 illustrated in FIG. 5.

Although some example embodiments of the technology have been described in the foregoing by way of example with reference to the accompanying drawings, the technology is by no means limited to the embodiments described above. It should be appreciated that modifications and alterations may be made by persons skilled in the art without departing from the scope as defined by the appended claims. The technology is intended to include such modifications and alterations in so far as they fall within the scope of the appended claims or the equivalents thereof. For example, in an illustrated example embodiment, the continuously variable transmission 17 (e.g., the transmission mechanism) may be provided between the engine 13 and the drive wheel 24, although it is not limited thereto. In some embodiments, an automatic transmission of, for example, a planetary gear type may be provided as the transmission mechanism. Further, in an illustrated example embodiment, the motor generator 14 may be provided on an input side of the continuously variable transmission 17 (e.g., the transmission mechanism), although it is not limited thereto. In some embodiments, the motor generator 14 may be provided on an output side of the continuously variable transmission 17 (e.g., the transmission mechanism).

In an example embodiment illustrated in FIG. 5, the motor torque proportion Ptm may be decreased continuously from the timing at which the input rotation speed N1 has reached the proportion adjustment rotation speed Nup2 to the timing at which the input rotation speed N1 reaches the upshift rotation speed Nup1, i.e., the motor torque proportion Ptm may be decreased continuously from the timing t2 to the timing t3, although it is not limited thereto. In some embodiments, the decrease in the motor torque proportion Ptm may be stopped before the input rotation speed N1 reaches the upshift rotation speed Nup1 (the timing t3). In addition, in an example embodiment illustrated in FIG. 5, the motor torque proportion Ptm may be decreased continuously at a constant decreasing speed, although it is not limited thereto. In some embodiments, the motor torque proportion Ptm may be decreased stepwise. In some embodiments, the decreasing speed of the motor torque proportion Ptm may be changed. Further, in an example embodiment illustrated in FIG. 5, the motor torque Tm may be decreased to substantially zero at the timing (the timing t3) at which the input rotation speed N1 has reached the upshift rotation speed Nup1, although it is not limited thereto. In some embodiments, the motor torque Tm may be set on a powering side at the timing t3 illustrated in FIG. 5. In some embodiments, the motor torque Tm may be set on a regeneration side at the timing t3 illustrated in FIG. 5.

According to at least one embodiment of the technology, the proportion of the torque of the electric motor to the drive wheel torque is decreased, before the execution of the upshift of the transmission mechanism, as compared with the most-recent proportion of the torque of the electric motor to the drive wheel torque. Hence, it is possible to execute the upshift of the transmission mechanism while reducing a sense of discomfort to be given to the driver.

The main processor 34, the engine processor 30, and the motor processor 32 illustrated in FIG. 2 are each implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of any of the main processor 34, the engine processor 30, and the motor processor 32. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of any of the main processor 34, the engine processor 30, and the motor processor 32 illustrated in FIG. 2.

The invention claimed is:

1. A control apparatus for a vehicle, the control apparatus being configured to be applied to a hybrid vehicle that includes an electric motor, an engine, and a drive wheel, the electric motor and the engine being coupled to the drive wheel, the control apparatus comprising:
   a transmission mechanism to be provided between the engine and the drive wheel, and configured to switch between a plurality of fixed gear ratios to perform a shift; and
   a torque processor configured to temporarily decrease a torque of the electric motor and a torque of the engine upon execution of an upshift of the transmission mechanism, and configured to continuously decrease, from a first timing before the execution of the upshift of the transmission mechanism toward a second timing of the execution of the upshift of the transmission mechanism, a proportion of the torque of the electric motor to a drive wheel torque of the drive wheel to be transmitted from the transmission mechanism to the drive wheel as compared with a recent proportion of the torque of the electric motor to the drive wheel torque before or at the first timing,
   wherein the torque processor is configured to continuously decrease, from the first timing before the execution of the upshift of the transmission mechanism toward the second timing of the execution of the upshift of the transmission mechanism, the proportion of the torque of the electric motor to the drive wheel torque as compared with the recent proportion of the torque of the electric motor to the drive wheel torque before or at the first timing by continuously increasing the torque of the engine.

2. The control apparatus for the vehicle according to claim 1, wherein the torque processor is configured to continuously decrease, from the first timing before the execution of the upshift of the transmission mechanism toward the second timing of the execution of the upshift of the transmission mechanism, the proportion of the torque of the electric motor to the drive wheel torque as compared with the recent proportion of the torque of the electric motor to the drive wheel torque before or at the first timing by continuously decreasing the torque of the electric motor.

3. The control apparatus for the vehicle according to claim 1, wherein the torque processor is configured to keep, from the first timing to the second timing, the drive wheel torque constant.

4. The control apparatus for the vehicle according to claim 2, wherein the torque processor is configured to keep, from the first timing to the second timing, the drive wheel torque constant.

5. The control apparatus for the vehicle according to claim 1, wherein the torque processor is configured to continuously decrease, from the first timing before the execution of the upshift of the transmission mechanism toward the second timing of the execution of the upshift of the transmission mechanism, the proportion of the torque of the electric motor to the drive wheel torque of the drive wheel at a constant decreasing speed rate.

6. The control apparatus for the vehicle according to claim 1, wherein the torque processor is configured to continuously decrease, from the first timing before the execution of the upshift of the transmission mechanism to a third timing before the second timing, the proportion of the torque of the electric motor to the drive wheel torque of the drive wheel.

7. The control apparatus for the vehicle according to claim 1, wherein the torque processor is configured to increase, from the first timing to the second timing, the torque of the engine to compensate for decreasing in the torque of the electric motor.

8. The control apparatus for the vehicle according to claim 7, wherein the torque processor is configured to decrease the proportion of the torque of the electric motor to the drive wheel torque at a constant decreasing rate such that the proportion of the torque of the electric motor to the drive wheel torque is substantially zero at the second timing.

9. A control apparatus for a vehicle, the control apparatus being configured to be applied to a hybrid vehicle that includes an electric motor, an engine and a drive wheel, the electric motor and the engine being coupled to the drive wheel, the control apparatus comprising:
 a transmission mechanism to be provided between the engine and the drive wheel, and configured to switch between a plurality of fixed gear ratios to perform a shift; and
 circuitry configured to constantly decrease, from a first timing before execution of an upshift of the transmission mechanism toward a second timing of the execution of an upshift of the transmission mechanism, a proportion of a torque of the electric motor to a drive wheel torque of the drive wheel to be transmitted from the transmission mechanism to the drive wheel as compared with a recent proportion of the torque of the electric motor to the drive wheel torque before or at the first timing,
 wherein the circuitry is configured to continuously decrease, from the first timing before the execution of the upshift of the transmission mechanism toward the second timing of the execution of the upshift of the transmission mechanism, the proportion of the torque of the electric motor to the drive wheel torque as compared with the recent proportion of the torque of the electric motor to the drive wheel torque before or at the first timing by continuously increasing the torque of the engine.

10. A control apparatus for a vehicle, the control apparatus being configured to be applied to a hybrid vehicle that includes an electric motor, an engine, and a drive wheel, the electric motor and the engine being coupled to the drive wheel, the control apparatus comprising:
 a transmission mechanism to be provided between the engine and the drive wheel, and configured to switch between a plurality of fixed gear ratios to perform a shift; and
 a torque processor configured to temporarily decrease a torque of the electric motor and a torque of the engine upon execution of an upshift of the transmission mechanism, and configured to continuously increase, from a first timing before the execution of the upshift of the transmission mechanism toward a second timing of the execution of the upshift of the transmission mechanism, a proportion of the torque of the engine to a drive wheel torque of the drive wheel to be transmitted from the transmission mechanism to the drive wheel as compared with a recent proportion of the torque of the engine to the drive wheel torque before or at the first timing.

* * * * *